Oct. 17, 1967   J. A. OWCZAREK   3,347,520
TURBOMACHINE BLADING
Filed July 12, 1966

INVENTOR
Jerzy A. Owczarek

BY Joseph J. O'Keefe
ATTORNEY

United States Patent Office 3,347,520
Patented Oct. 17, 1967

3,347,520
TURBOMACHINE BLADING
Jerzy A. Owczarek, 1908 Pinehurst Road,
Bethlehem, Pa. 18018
Filed July 12, 1966, Ser. No. 564,685
12 Claims. (Cl. 253—77)

ABSTRACT OF THE DISCLOSURE

Turbomachine apparatus having in at least one row of blades, blades with at least a portion of their leading edges recessed relative to the leading edges of other blades in the same row so that pressure waves reflecting in the vicinity of the leading edges of the blades in such row are disrupted by the non-uniformity of wave reflecting surfaces.

---

This invention relates to turbomachines, i.e. turbines, compressors, and similarly bladed fluid flow machines, and more particularly to turbomachine blading.

It has long been known that the blades of turbomachines are exposed to unsteady flows which produce complex pressure fluctuations or waves of variable intensity. One form of unsteady flow in turbomachines has been described by this inventor in A.S.M.E. Paper No. 66–GT–99, "On a Wave Phenomenon in Turbines," presented at the A.S.M.E. Gas Turbine Conference and Products Show, Zurich, Switzerland, Mar. 15, 1966. This paper discloses a periodic wave phenomenon which occurs in running turbine stages, i.e. two adjacent blade rows, one of which is a stationary row and one of which is a moving row. This wave phenomenon consists of concentrated pressure waves or pulses, which, when conditions are favorable, may be generated in the vicinity of the leading edges of the moving rotor blades, propagate toward the suction side of the stationary stator blades, are reflected back toward the rotor blades, collide with the moving rotor blades in the vicinity of their leading edges, and are again reflected toward the stationary stator blades. This type of unsteady flow occurs most frequently in turbomachines of conventional construction wherein the leading edges of all the blades in a row lie in the same surface of revolution and are equally spaced.

In a turbomachine stage, in certain ranges of operating conditions, such as the number of revolutions per minute or the fluid temperature and pressure at the inlet to the stage, there may exist a number of different types of reflecting waves. Some waves may travel circumferentially with respect to the stator in the direction of rotation of the turbomachine shaft, or in the opposite direction. Different wave types, in general, span different numbers of stator or rotor blade pitches in consecutive reflections from the blades of a given row. The reflecting waves, when their number and intensity is large enough, may result in a loss in the operating efficiency of a turbomachine by producing transient or sustained separation of flow from blades in the vicinity of their trailing edges. At the natural frequency of the blades these reflecting waves contribute to blade failure. In addition, these waves contribute to the generation of high intensity noise which is a particularly aggravating problem in aircraft jet engines.

An object therefore of this invention is to provide an improved turbomachine blading construction wherein the number and intensity of the above-described waves are significantly reduced.

Another object of this invention is to provide an improved turbomachine blading construction which will improve blade reliability and machine operating efficiency.

Still another object of this invention is to provide an improved turbomachine which in operation will have a lower intensity of noise than similar machines now in use.

The foregoing objects can be attained by constructing turbomachine blading so that a nonuniformity of wave reflecting surfaces is introduced in one or more rows of blades.

Referring to the drawings.

Figure 1:
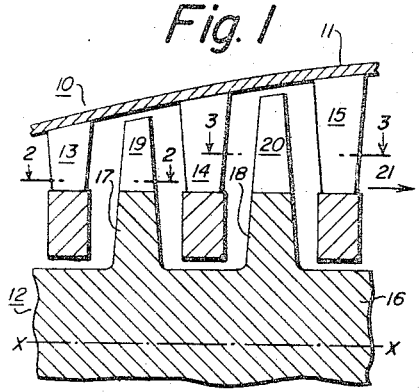
FIG. 1 is a partial diagrammatic longitudinal sectional view through a multistage axial flow turbine.

With reference first to FIG. 1 there is shown turbine 10 having outer casing 11 and rotor assembly 12. Projecting inwardly from casing 11 and attached thereto in any suitable manner are axially spaced rows 13, 14 and 15 of stator or fixed blades, with the blades in any one row equally spaced, hereinafter more fully described. Rotor assembly 12 comprises shaft 16, having axis X—X, and rotor wheels 17 and 18 upon which are mounted rows 19 and 20 respectively of peripherally spaced rotor or moving blades, with the blades in any one row equally spaced, hereinafter more fully described. Stator blading rows 13, 14 and 15 alternate with rotor blading rows 19 and 20, and the general direction of fluid flow through turbine 10 is shown by arrow 21, i.e. from left to right.

Turbine 10 has row 13 of stator blades and row 19 of rotor blades constructed in the conventional manner. In this construction, in any one row of blading, stator or rotor, all the blades are identical, within manufacturing tolerances, in height, cross section, and configuration, and the leading edges (L.E.) of all the blades lie in the same surface of revolution while the trailing edges (T.E.) of all the blades lie in another surface of revolution.

Figure 2:
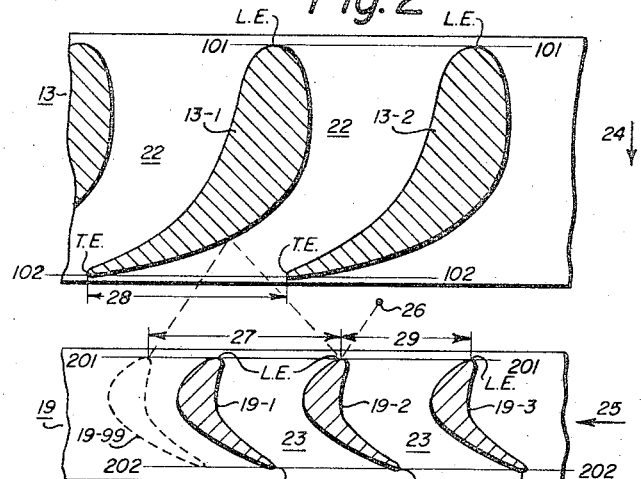
FIG. 2 is a fragmentary development of the blading of the turbine of FIG. 1 along the line 2—2, which represents a circular cylindrical surface whose axis corresponds to the axis of the turbine shaft, with broken lines indicating an example of a path which one type of reflecting pressure waves may take between rows of turbine blades of conventional construction.

As shown in FIG. 2, stator row 13 has like blades 13–1, 13–2, etc. for as many blades as there are in the row, which are identical in height, cross-section, and configuration. Blades 13–1, 13–2, etc. have their leading edges (L.E.) lying in the same surface of revolution, indicated by line 101—101, and their trailing edges (T.E.) lying in the same surface of revolution, indicated by line 102—102. Between each pair of stator blades of blading row 13 is stator flow passage 22.

In like manner rotor row 19 has like blades 19–1, 19–2, 19–3, etc., for as many blades as there are in the row, which are identical in height, cross-section, and configuration. Blades 19–1, 19–2, 19–3, etc. have their leading edges (L.E.) lying in the same surface of revolution, indicated by line 201—201, and their trailing edge (T.E.) lying in the same surface of revolution, indicated by line 202—202. Between each pair of rotor blades of blading row 19 is rotor flow passage 23.

FIG. 2 shows an example of a path which a pressure pulse may take between consecutive reflections from a rotor blading row having blading constructed in the conventional manner. Arrow 24 indicates the general direction of fluid flow and arrow 25 shows the rotational direction of rotor blade row 19. A pressure pulse 26, shown as a dot, whose path is shown as a broken line, previously reflected from the vicinity of the leading edge of blade 19–99, when at the position shown in phantom, travels toward and strikes the suction side of stator blade 13–1 of upstream stator blading row 13. Pulse 26 is reflected back toward rotor blading row 19 and strikes rotor blade 19–2, in the vicinity of its leading edge, which blade, in turn reflects, at a later time, the same pulse 26 toward another blade of stator blading row 13. The distance 27, measured along line 201—201, between the leading edges (L.E.) of blades 19–99 and 19–2 at the points of reflection of the pressure pulse corresponds to pitch 28 of blades 13–1, 13–2, etc. of stator blading row 13, which is greater than pitch 29 of blades 19–1, 19–2, 19–3, etc. of rotor blading 19. Other reflecting pulses may occur along similar paths between the blades of stator blading row 13 and the blades of the upstream rotor blading row, not shown. The uniformity of construction of the above described stator and rotor blading in each row contributes to this wave reflection.

Pressure pulses or waves to this nature can be disrupted and their harmful effects decreased by constructing in a turbine one or more rows of blading in accordance with my invention. In my construction at least one row of blading comprises blades of different widths, standard blades and recessed blades, of shorter width on at least a part of their height, whose leading edges are wholly or partially set back from the leading edges of the standard blades. All the blades, in a row of blading constructed in this manner, have their trailing edges lying in the same surface of revolution. The standard blades comprise more than 50% of the blades in a row of such blading and the recessed blades comprise at least 5% of the total number of blades in such row. The recessed blades can be placed singly or in groups of two or more blades to a group, between the standard blades or in a combination of such arrangements. Grouping of the blades is, in general, beneficial because it ensures disruption, at the location of the group in the particular row of such blades, of all incoming waves which, in their consecutive reflections from the blades of that row, span the number of blade pitches equal to or smaller than the number of blades in that group.

Figure 3:
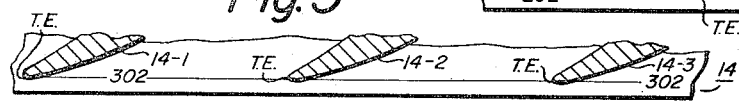
FIG. 3 is a fragmentary development of the blading of FIG. 1 along the line 3—3, which represents a circular cylindrical surface whose axis corresponds to the axis of the turbine shaft, showing the blading construction of this invention.
Figure 4:
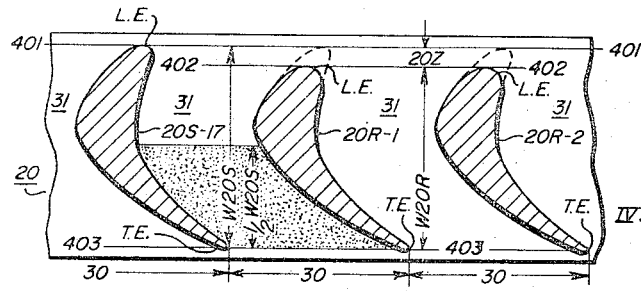
FIG. 4 is a front view of a rotor of the turbine of FIG. 1 showing blading construction according to one embodiment of this invention.

The construction of my invention and one embodiment thereof is shown in FIGS. 3 and 4. Stator blading row 14 has blades 14–1, 14–2, 14–3, etc., the trailing edges (T.E.) of which lie in the same surface of revolution, indicated by line 302—302. Adjacent downstream blading row 20, shown in front view in FIG. 4, comprises blades having two different widths, standard blades 20S–1, etc. and recessed blades 20R–1, 20R–2, etc. Standard blades 20S–1, etc. have their leading edges (L.E.) lying in the same surface of revolution, indicated by line 401—401, while recessed blades 20R–1, 20R–2, etc. have their leading edges (L.E.) lying in another surface of revolution, indicated as line 402—402, spaced downstream, in the cross-section shown, recessed distance 20Z from surface of revolution 401—401. Distance 20Z is measured in a line parallel to axis X—X of shaft 16. The trailing edges (T.E.) of all blades in rotor blading row 20, i.e. standard blades 20S–1, etc., and recessed blades 20R–1, 20R–2, etc. lie in the same surface of revolution, indicated by line 403—403. Standard blades 20S–1 etc. have a width W20S, and recessed blades 20R–1, 20R02, etc. have a width W20R which is shorter, by recess distance 20Z, than width W20S of the standard blades.

Preferably, the trailing portions of standard blades 20S–1, etc. and recessed blades 20R–1, 20R–2, etc. are of the same configuration and essentially equal in cross-sectional area. For purposes of this invention the trailing portion of each of these blades is considered to be that portion of the blade from the trailing edge (T.E.) upstream a distance equal to one-half the width W of the standard blade in such row.

In rotor blading row 20 all of the blades, standard and recessed, are equally spaced peripherally of rotor wheel 18 so that pitch 30 of the blades, as measured along line 403—403 of the trailing edges (T.E.) of the blades is equal. Between each pair of blades, i.e. between a pair of standard blades, between a pair of recessed blades, and between a standard and recessed blade, is rotor flow passage 31. Rotor flow passages 31 are alike in cross-section when recess distance 20Z is small compared to the width W20S of the standard blades, but in all instances the trailing portions of rotor flow passages 31 in blading row 20 are of the same configuration and essentially equal in cross-sectional area. For purposes of this invention the trailing portion of a flow passage is defined as that area between two adjacent blades of a row, from the trailing edges (T.E.) of the blades upstream a distance equal to one-half of the width W of the standard blade in such row. In FIG. 3, in blading row 20 the trailing portion of rotor flow passage 31 between blades 20S–17 and 20R–1 is shaded for purpose of illustration.

Recessed blades may also be provided in a row of stator blading, as for example in stator blading row 15 adjacent to and downstream of rotor blading row 20. Stator blading row 15 comprises standard blades 15S–1, etc. and recessed blades 15R–1, etc. Standard blades 15S–1, etc. have their leading edges (L.E.) lying in the same surface of revolution, indicated by line 501—501 and recessed blades 15R–1, etc. have their leading edges lying in another surface of revolution, indicated by line 502—502, spaced downstream, in the cross-section shown, recessed distance 15Z from surface of revolution 501—501. Distance 15Z is measured in a line parallel to axis X—X of shaft 16. The trailing edges (T.E.) of all blades in stator blading row 15, i.e. standard blades 15S–1, etc. and recessed blades 15R–1, etc. lie in the same surface of revolution, indicated by line 503—503. Standard blades 15S–1, etc. have a width W15S, and recessed blades 15R–1, etc. have a width W15R which is shorter, by recess distance 15Z, than width W15S of the standard blades. All of the blades in stator blading row 15 are equally spaced and between each pair of blades in the row is stator flow passage 33. Stator flow passages 33 are alike in cross-section when recess distance 15Z is small compared to the width W15S of the standard blades, but in all instances the trailing portions of stator flow passages are of similar configuration and essentially equal in cross-sectional area. In FIG. 3, in blading row 15 the trailing portion of stator flow passage 33 between blade 15S–1 and 15R–1 is shaded for purpose of illustration.

In FIG. 4, which is a front view of rotor wheel 18 and rotor blading row 20, there is shown one embodiment of my invention. As shown in FIG. 3 and as described hereinabove blading row 20 comprises standard blades 20S–1, etc. and recessed blades 20R–1, etc. all of which are equally spaced around the periphery of wheel 18 and between each pair of which is a rotor passage 31. The standard blades, which comprise more than 50% of the blades in the row, are mounted in four groups of seventeen blades; group IS having blades 20S–1 through 20S–17, group IIS having blades 20S–18 through 20S–34, group IIIS having blades 20S–35 through 20S–51 and group IVS having blades 20S–52 through 20S–68. The recessed blades which are a minority of the blades in the row are mounted in four groups of seven blades; group IR having blades 20R–1 through 20R–7, group IIR having blades 20R–8 through 20R–14, group IIIR having blades 20R–15 through 20R–21 and group IVR having blades 20R–22 through 20R–8. The groups of standard and recessed blades are alternated with one another. This arrangement permits, at most, from the blades of this row seventeen reflections of waves which span one pitch of these blades between consecutive reflections, eight such reflections of waves which span two blade pitches, and five such reflections of waves which span three blade pitches. Thus, it ensures a rapid disruption of a large number of reflecting waves which may exist at the operating conditions of this rotor wheel.

While FIG. 4 shows one embodiment of my invention it should be understood that the recessed blades may be provided in one or more rows of stator or rotor blades of a multi-stage turbine or on both the stator and rotor blade rows of one or more stages of a turbine.

The standard and recessed blades in any one row of blading are essentially of the same height H and preferably of the same general configuration. From a purely practical view-point, the standard and recessed blades of the same row can be made from the same blade blanks or forgings by merely removing from the front or the lead-edges of the blanks or forgings of the recessed blades more material than is removed from the front or leading edges of the blanks or forgings of the standard blades. Distance Z, the amount by which the leading edges of the recessed blades in a row are set back from the leading edges of the standard blades of the same row, is limited by the requirement that the width WR of a recessed blade be equal to at least 75% of the width WS of a standard blade in the same row. Therefore, distance Z in any row of blading can not exceed 25% of the width WS of the standard blade in the same row. In FIG. 3 in blading row 20 recessed blades 20R-1, 20R-2, etc. were made by machining from standard blades that portion shown in broken line at the leading edge of the recessed blades.

Figure 5:
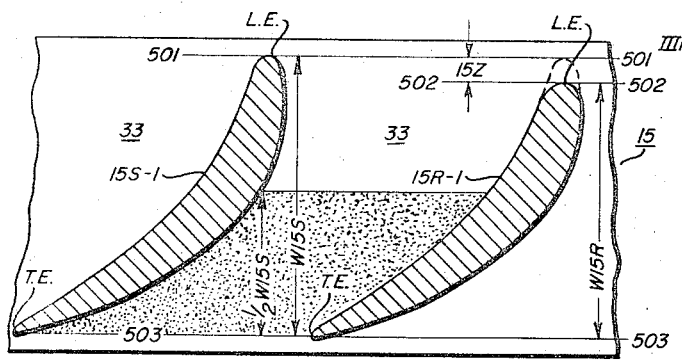
FIGS. 5, 6 and 7 show examples of various forms of blades which may be utilized in the blading construction of this invention.
Figure 6:
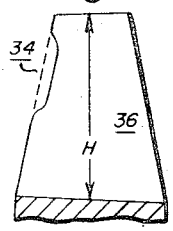
Figure 7:
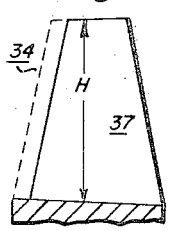

In FIGS. 5, 6 and 7 there are shown various forms of blades which may be used in the blading construction of this invention. In FIG. 5 a standard blade 34 has had a part of the leading edge, shown by broken line, machined away to form blade 35. In FIG. 6, standard blade 34 has had a part of the upper portion of the leading edge machined away to form blade 36, and in FIG. 7 a uniform amount has been machined from blade 34 along the full length of its leading edge to form blade 37. The height H of each of blades 35, 36 and 37 is the same as the height of the standard blades 34 from which blades 35, 36 and 37 are formed.

As those skilled in turbomachine art well know, in certain machines, especially in steam turbines, in some rotor wheels the blades are attached in such a manner that at one or, at most, at a few locations the blades are not equally spaced because of the method of attaching the blades. It should be understood that the same situation could occur in turbomachines utilizing my invention and, that in such instances, even though it may be desirable to have the blades in a row equally spaced it may be necessary to modify the spacing to complete the assembly of the blades on a wheel.

While there has hereinbefore been shown and described in detail my invention as embodied in a turbine, it is not intended to limit the invention to turbines or the specific forms disclosed, but my invention is intended to cover all turbomachines in general, i.e. turbines, compressors and similarly bladed fluid flow machines falling within the spirit and scope of the invention as expressed in the appended claims.

I claim:

1. In combination in a turbomachine, a casing, a plurality of rows of peripherally spaced stator blades, with stator flow passages therebetween, mounted therein and extending inwardly therefrom, a rotor positioned in said casing for rotation about an axis and having mounted thereon a plurality of rows of peripherally spaced rotor blades, with rotor flow passages therebetween, at least one of said rows of blades comprising first blades, comprising more than 50% of the blades in said row, and second blades, comprising at least 5% of the blades in said row, having at least a portion of the leading edges thereof recessed relative to the leading edges of said first blades whereby pressure waves reflecting in the vicinity of the leading edges of a row of said first blades and said second blades are disrupted by the non-uniformity of the leading edges thereof.

2. Apparatus as described in claim 1 wherein all of the blades in said row comprising first and second blades are equally spaced and of essentially the same height.

3. Apparatus as described in claim 2 wherein the trailing portions of all of said blades in said row comprising first and second blades are of essentially the same cross-sectional area and configuration and the portions of the flow passages between the trailing portions of all of the blades in said row are essentially equal in cross-sectional area.

4. Apparatus as described in claim 1 wherein said row of blades comprising first blades and second blades is a row of stator blades.

5. Apparatus as described in claim 1 wherein said row of blades comprising first blades and second blades is a row of rotor blades.

6. Apparatus as described in claim 1 wherein said row of blades comprising first blades and second blades is a row of rotor blades and in addition there is a row of stator blades comprising third blades and fourth blades having at least a portion of the leading edges thereof recessed relative to the leading edges of said third blades.

7. Apparatus as described in claim 1 wherein said recessed portion of said second blade is no more than 25% of the width of said first blades.

8. Apparatus as described in claim 4 wherein the trailing portions of all of the baldes in said row comprising first and second blades are of essentially the same cross-sectional area and configuration and the portions of the flow passages between the trailing portions of all of the blades in said row are essentially equal in cross-sectional area.

9. In combination in a turbomachine, a casing, a plurality of rows of spaced stator blades, with stator flow passages therebetween, mounted therein and extending inwardly therefrom, a rotor positioned in said casing for rotation about an axis and having mounted thereon a plurality of rows of spaced rotor blades, with rotor flow passages therebetween, at least one of said rows of stator blades comprising first blades and second blades, having at least a portion of the leading edges thereof recessed relative to the leading edges of said first blades, the trailing portions of said first and said second blades being of essentially the same cross-sectional area and configuration and the portions of the flow passages between the trailing portions of said first and second blades being essentially equal in cross-sectional area whereby pressure waves reflecting in the vicinity of the leading edges of a row of said first blades and said second blades are disrupted by the non-uniformity of the leading edges thereof.

10. In combination in a turbomachine, a casing, a plurality of rows of spaced stator blades with stator flow passages therebetween, mounted therein and extending inwardly therefrom, a rotor positioned in said casing for rotation about an axis and having mounted thereon a plurality of rows of spaced rotor blades, with rotor flow passages therebetween, at least one of said rows of rotor blades comprising first blades and second blades, having at least a portion of the leading edges thereof recessed relative to the leading edges of said first blades, and at least one of said rows of stator blades comprising third blades and fourth blades, having at least a portion of the leading edges thereof recessed relative to the leading edges of said third blades, whereby pressure waves reflecting in the vicinity of the leading edges of a row of said first blades and said second blades and a row of said third blades and said fourth blades are disrupted by the non-uniformity of the leading edges thereof.

11. Apparatus as described in claim 10 wherein in a row of stator blades comprising said third blades and said fourth blades, said third blades comprise more than 50% of the blades in said row and said fourth blades comprise at least 5% of the blades in said row.

12. Apparatus as described in claim 10 wherein the flow passages between the trailing portioins of said first and second blades of a rwo of rotor blades are essentially equal in cross-sectional area and the flow passages between the trailing portions of said third and said fourth blades of a row of stator blades are essentially equal in cross-sectional area.

References Cited

UNITED STATES PATENTS 2,792,983  5/1957  Stalker _____ 253—77 X
2,819,732  1/1958  Paetz _____ 253—78 X

FOREIGN PATENTS 1,566    4/1926  Austrailia.
439,905  1/1927  Germany.
128,030  4/1950  Sweden.

EVERETTE A. POWELL, JR., *Primary Examiner.*